United States Patent Office 3,754,029
Patented Aug. 21, 1973

3,754,029
CONTINUOUS PROCESS FOR THE PURIFICATION OF MONOCHLOROACETIC ACID
Walter Freyer, Augsburg, and Manfred Gscheidmeier, Gersthofen, and Rolf Holtermann, Augsburg, and Rudolf Wirtz, Goggingen, Germany, assignors to Farbwerke Hoechst Aktiengesellschaft vormals Meister Lucius & Bruning, Frankfurt am Main, Germany
No Drawing. Continuation of abandoned application Ser. No. 757,751, Sept. 5, 1968. This application Sept. 13, 1971, Ser. No. 180,202
Claims priority, application Germany, Sept. 19, 1967, F 53,529
Int. Cl. C07c 51/42
U.S. Cl. 260—539 A                                                  7 Claims

ABSTRACT OF THE DISCLOSURE

Di- and trichloroacetic acid contained as impurities in crude monochloroacetic acid are partially dehalogenated and transformed in monochloroacetic acid at a temperature of from 110 to 145° C. in a continuous process in the presence of hydrogen while trickling through a catalyst layer the active constituent of which is a noble metal of subgroup VIII of the Periodic Table.

---

This application is a continuation of application Ser. No. 757,751, filed Sept. 5, 1968, and now abandoned.

The present invention relates to a process for the continuous purification of crude monochloroacetic acid by partial dehalogenation of di- and trichloroacetic acid contained therein.

In the manufacture of monochloroacetic acid by chlorination of glacial acetic acid smaller or greater proportions of di- and trichloroacetic acid are formed as by-products which must be removed from the monochloroacetic acid so as to meet the requirements of quality. The crude acid mixture can be worked up, for example, by crystallization directly from the melt of from solutions. In addition to the desired pure acid a mother liquor is obtained which may be further chlorinated to trichloroacetic acid—in which case the production of monochloroacetic acid is coupled with the production of trichloroacetic acid—or hydrogenated in the presence of noble metal catalysts to transform the di- and trichloroacetic acid into monochloroacetic acid or into acetic acid.

In the known hydrogenation processes, which relate partially to the working up of mother liquors, partially to the direct hydrogenation of crude acid (cf. German Pats. 910,778, 1,072,980 and 1,201,326, Netherlandish Pat. 109,768 and U.S. Pat. 2,863,917) the acid mixture, which is generally obtained in the form of a melt, is reacted with hydrogen either discontinuously in the presence of a catalyst suspended in the acid, or continuously in the form of vapor or as aerosol in the presence of stationary catalysts. The known processes are carried out at a temperature in the range of from the melting point of the starting mixture and about 250° C. At a temperature below 90° C. the reaction proceeds quite slowly, while at about 140° C. the speed of reaction is sufficient but the hydrogenation is only little selective, i.e. besides the desired monochloroacetic acid acetic acid is formed in the first place. In addition thereto, products of lower oxidation stage are obtained, for example aldehydes, forming condensation products which resinify on the catalysts, impair their activity and color the reaction products.

It has now been found that crude monochloroacetic acid can advantageously be freed in a continuous process from the di-, and trichloroacetic acid contained therein by partial dehalogenation by passing the crude acid, at a temperature in the range of from about 110° C. to 145° C., over a hydrogenation catalyst consisting of noble metals of the eighth subgroup of the Periodic Table precipitated on an acid-resistant carrier material, while simultaneously introducing hydrogen.

As compared with a discontinuous process, the continuous hydrogenation in the liquid phase according to the invention in the presence of a stationary catalyst has the advantage that after the reaction a complicated separation of the finely divided catalyst, which mostly involves expensive losses of noble metal, need not be carried through. As compared with the continuous reaction in the vapor phase the advantage resides in the fact that lower temperatures can be applied whereby a higher selectivity is obtained, i.e. a higher yield is obtained and less energy required. Moreover, the introduced acid washes away from the catalyst the small amounts of resinous products continuously formed so that the catalyst remains active for a longer period of time than in the reaction in the gaseous phase. The most important advantage is, however, that the di- and trichloroacetic acid contained in the crude acid is hydrogenated only to the stage of monochloroacetic acid and that noticeable amounts of acetic acid are not formed anew. The process of the invention is, therefore, especially suitable for the purification of crude acid mixture, which are generally obtained in continuous manner, because the common discontinuous crystallizations can be dispensed with, trichloroacetic acid need not be produced from the mother liquor of the crystallizations and monochloroacetic acid can be produced and purified in a continuous and thus economical, combined process.

The process of the invention is especially suitable for purifying crude chloroacetic acid as obtained in the chlorination of glacial acetic acid in the presence of acetic anhydride and/or acetyl chloride and containing, besides a small proportion of unreacted acetic acid, about 3 to 10% by weight of dichloroacetic acid and, in general, at most 1% by weight of trichloroacetic acid.

Suitable hydrogenation catalysts are the noble metals of subgroup VIII of the Periodic Table, preferably the metals of the palladium group, either individually or in admixture with one another or in the form of alloys. The catalysts are advantageously supported on an acid-resistant carrier material such as carbon, aluminium oxide, silicic acid, silicon carbide or boron carbide. The carrier material is used in a form that is especially suitable for the liquid/gas exchange, for example balls, rings, cylinders or saddles. A catalyst having especially advantageous properties consists, for example, of cylinders of silicic acid impregnated with 0.5% by weight of palladium. Addition of small amounts of gold to the specified catalysts has a favorable effect on the selectivity of the reaction.

The hydrogenation is carried out at a temperature in the range of from about 110 to 145° C., preferably about 115 to 125°, either in parallel flow or preferably in countercurrent flow. The reaction can be performed at atmospheric pressure as well as under reduced or elevated pressure, the lower limit being at about 20 mm. of mercury and the upper limit at about 40 atmospheres excess. It is advantageous to operate under subatmospheric pressure when the reaction is performed in a high one-stage reactor and the content of hydrogen chloride dissolved in the acid is to be kept low by evacuation. It is more simple, however, from a technical point of view to operate under superatmospheric pressure whereby a higher selectivity can be obtained by a higher specific catalyst load or a lower temperature. The dehalogenation reaction being exothermic, it is necessary to regulate the heat balance in the reactor, for example by means of installed or interconnected cooling devices or, more simply, by a certain content of inert gas in the hydrogenation gas, advantageously by the hydrogen chloride itself.

The hydrogen used for the hydrogenation, which may contain inert gases, for example nitrogen, should be free from oxygen to as large an extent as possible. Still further, care must be taken that all substances having a detrimental action on the catalyst, especially mercury vapors which are mostly contained in the hydrogen obtained by the chlorine/alkali electrolysis according to the amalgam process, is quantitatively removed. Before it is fed to the reactor, the purified hydrogen is suitably heated at a temperature approximately corresponding to the reaction temperature. The amount of hydrogen required largely depends on the type of reactor used, on the packing from the reactor contains acetic acid and chloroacetic crude acid. In general, 2 to 10 times the theoretically required amount is used.

The hydrogen chloride formed in the hydrogenation of the fractions of di- and trichloroacetic acid has a selective influence on the desired reaction but simultaneously, as found by experiments, it inhibits the reaction so that for an optimum efficiency of the catalyst care must be taken that the content of hydrogen chloride in the hydrogenation gas does not exceed about 10% by volume.

The mixture of hydrogen chloride and hydrogen issuing from the reactor contains acetic acid and chloroacetic acid in vaporous form and it is freed from the latter products advantageously by fractional condensation. The condensation products are either returned into the chlorination apparatus or combined with the principal amount of hydrogenation products continuously leaving the reactor, from which the readily volatile fractions are separated by continuous introduction into the center part of a column kept under reduced pressure, or, if desired, blown out with air. After having removed the hydrogen chloride from the hydrogen/hydrogen chloride mixture, for example in a water wash, and dried, the hydrogen can be returned into the reaction.

The process of the invention can be carried out in individually operated reactors as well as advantageously in a plurality of reactors connected in cascade form. In the latter case the individual stages may be operated under different pressures, at different temperatures and with different loads. The hydrogen may be supplied at one point or at several points at different levels of the reactor. The reactor is suitably made of enamel. It is likewise possible, however, to use apparatus made of glass, silver, or other acid-resistant materials.

The monochloroacetic acid purified by the process of the invention is distinguished by an especially high quality. Without distillation with simple separation of the readily volatile by-products monochloroacetic acid having a degree of purity of at least 99.7% is obtained.

The following example serves to illustrate the invention but it is not intended to limit it thereto.

EXAMPLE

A heatable glass tube having a length of 2 meters and a diameter of 100 millimeters was filled with 18 liters of a hydrogenation catalyst of silicic acid compressed in the form of cylinders (length about 8 mm., diameter about 3.5 mm.) having a palladium content of 0.5% by weight. The glass tube was heated at a temperature of 120–122° C. and 3.5 kilograms per hour of a crude monochloroacetic acid consisting of 94.4% of monochloroacetic acid, 4.5% of dichloroacetic acid, 0.1% of trichloroacetic acid and 1.0% of acetic acid were passed through while simultaneously 350 liters per hour of dry pure hydrogen preheated at about 120° C. were introduced in counter-current flow. To separate the acetic acid, the hydrogenated acid issuing from the reaction tube was introduced into the center of a column maintained at 90–95° C., kept under a reduced pressure of 40 mm. of mercury with a reflux ratio of 4:1, at a head temperature of 41–43° C. and a temperature in the still of 112–113° C. The monochloroacetic acid accumulating in the still had a degree of purity of 99.7%.

What is claimed is:

1. A continuous process for purifying crude monochloroacetic acid by partial dehalogenation of the di- and trichloroacetic acid contained therein, which comprises trickling the crude acid in the liquid phase, at a temperature in the range of from 110° C. to 145° C., over a stationary hydrogenation catalyst consisting of at least one noble metal of subgroup VIII of the Periodic Table supported on an acid-resistant carrier material, simultaneously introducing hydrogen in countercurrent flow, and separating the acetic acid and monochloroacetic acid vapors contained in the hydrogen/hydrogen chloride waste gas leaving the reactor by fractional condensation.

2. The process of claim 1, wherein the hydrogenation catalyst consists of palladium precipitated on shaped bodies of silicic acid.

3. The process of claim 1, wherein the reaction is carried out in a plurality of reactors connected in series in the form of a cascade.

4. The process of claim 1, wherein the hydrogen used is preheated, is free from mercury and substantially free from oxygen.

5. The process of claim 1, wherein the reaction is carried out under a pressure in the range of from 20 mm. of mercury to 40 atmospheres excess.

6. The process of claim 1, wherein the condensation products obtained in the fractional condensation are combined with the crude main product.

7. A continuous process for purifying crude monochloroacetic acid by partial dehalogenation of the di- and trichloroacetic acid contained therein, which comprises trickling the crude acid in the liquid phase, at a temperature in the range of from about 110° C. to 145° C., over a stationary hydrogenation catalyst consisting of at least one noble metal of subgroup VIII of the Periodic Table supported on an acid-resistant carrier material, simultaneously introducing hydrogen in countercurrent flow and separating acetic acid from the hydrogenated mixture issuing from the reactor by volatilizing said acetic acid under reduced pressure or by blowing it out with air.

References Cited

UNITED STATES PATENTS

| 2,863,917 | 12/1958 | Rucker et al. | 260—539 |
| 3,071,615 | 1/1963 | Opitz et al. | 260—539 |

FOREIGN PATENTS

| 109,768 | 10/1964 | Netherlands | 260—539 |
| 1,201,326 | 9/1965 | Germany | 260—539 |

VIVIAN GARNER, Primary Examiner